United States Patent Office 3,459,289
Patented Aug. 5, 1969

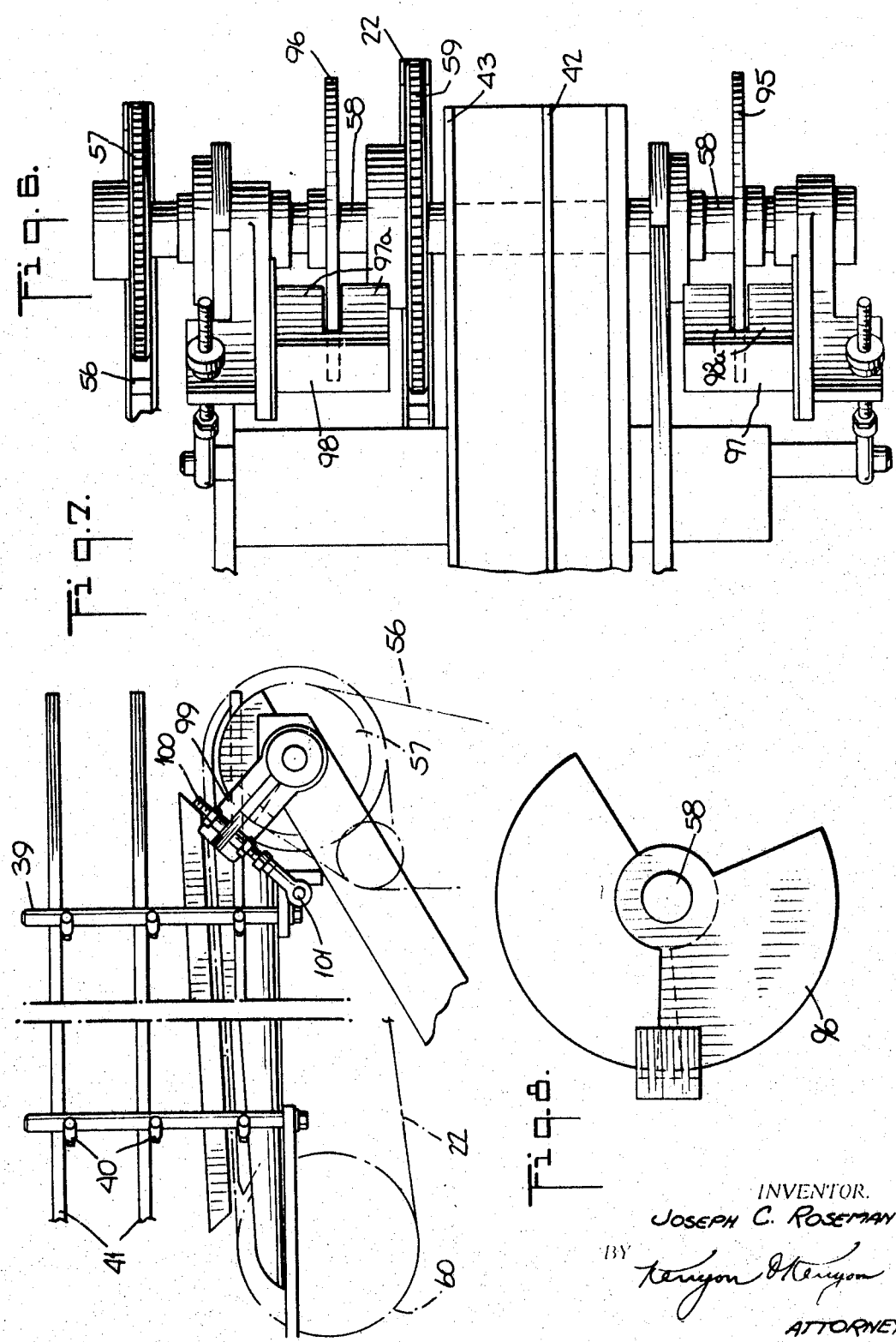

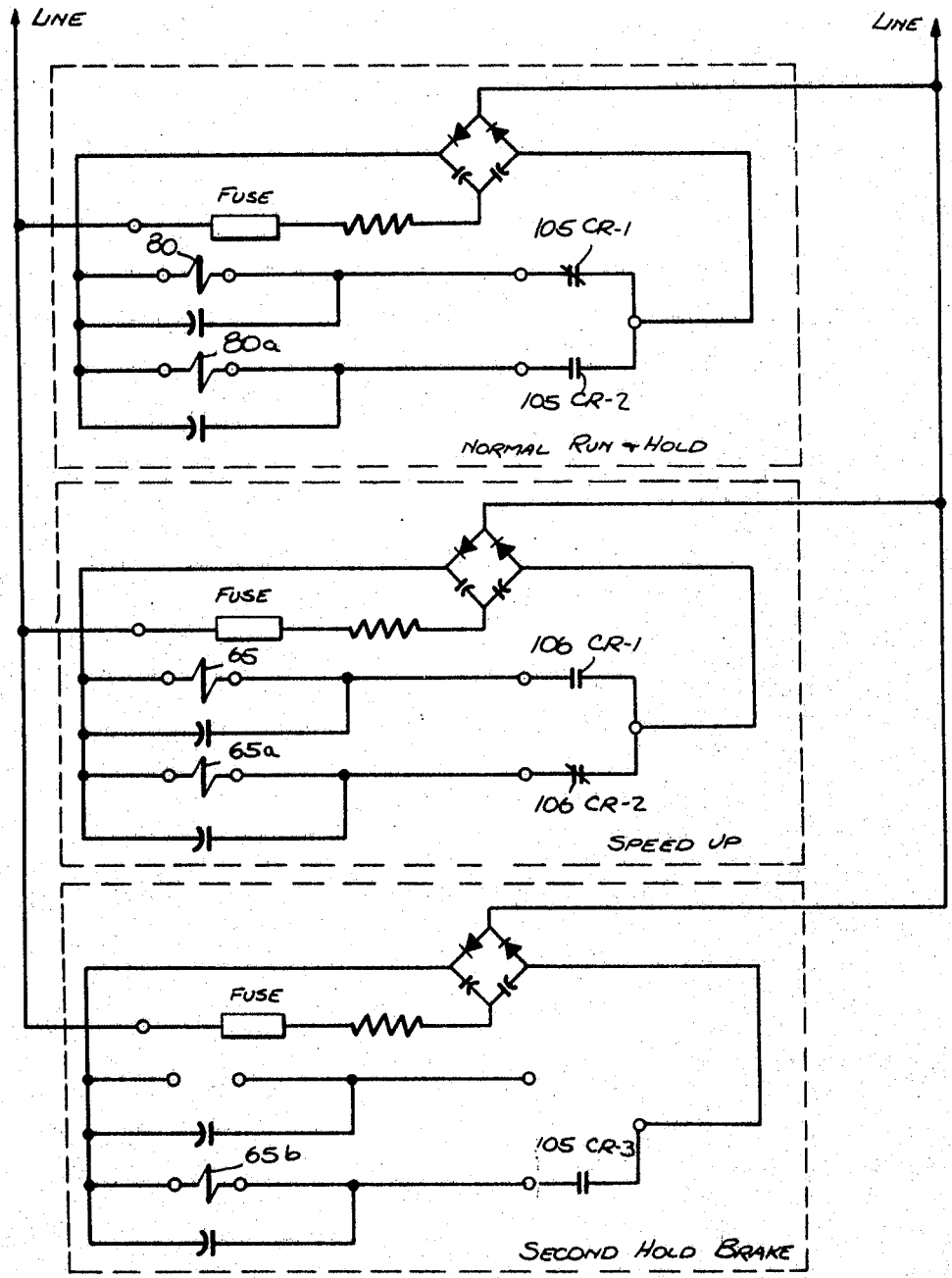

3,459,289
MACHINE AND METHOD FOR TRANSFERRING AN ARTICLE
Joseph Charles Roseman, Bethlehem, Pa., assignor to Harris-Intertype Corporation, a corporation of Delaware
Filed Jan. 2, 1968, Ser. No. 694,969
Int. Cl. B65g 47/00, 47/02, 43/08
U.S. Cl. 198—21                                    16 Claims

ABSTRACT OF THE DISCLOSURE

The disclosure relates to a machine for transferring an article from an infeed apparatus to an outfeed apparatus with the article being delivered to the outfeed apparatus in a predetermined phase relationship therewith. In connection with book binding machinery, the transfer machine of the invention can be employed to transfer books from the chain conveyor of a gatherer to the chain conveyor of a binder. The transfer conveyor between the infeed conveyor and the outfeed conveyor can be driven at a plurality of speeds, the minimum of which is at least equal to the speed of operation of the outfeed apparatus. The arrival of the article is detected adjacent to the transfer conveyor. The machine includes means for controlling the driving means of the transfer conveyor into a selected one of its plurality of speeds. In addition, the machine includes means for producing a plurality of control signals each of which is responsive to a different one of a plurality of phase conditions of the outfeed apparatus including a condition in which the article cannot be conveyed by the transfer conveyor to the outfeed apparatus, a condition in which the article can be conveyed at the velocity of the outfeed conveyor, and a final condition in which the article can be conveyed at a greater speed than the outfeed apparatus in order to be delivered thereto. In response to the control signal from the signal producing means and in response to the detection of the arrival of an article by the detecting means, the controlling means selects the proper speed for operating the transfer conveyor. With this arrangement the article is held, transferred at the speed of the outfeed apparatus, or accelerated with respect to the outfeed apparatus in accordance, the phase relationship of the outfeed apparatus and the time of arrival of the article at the transfer conveyor.

Field of the invention

The invention pertains to the field of art of conveyors for transferring an article from one machine such as an infeed apparatus or conveyor to another machine such as an outfeed apparatus or conveyor in a predetermined manner. More in particular the invention relates to the field of art in which a transfer conveyor delivers an article to an outfeed apparatus in a predetermined phase relationship with respect to the frequency of events of the outfeed apparatus. In this way the article can be delivered to a predetermined location on the outfeed apparatus.

Description of the prior art

An example of a transfer machine in accordance with the prior art is found in copending U.S. patent application Ser. No. 663,903, filed Aug. 28, 1967 now U.S. Patent No. 3,399,755, in the names of Richard B. Hawkes et al. The transfer machine of the patent application employs a cam drive which is capable of accelerating an article by means of a transfer conveyor in response to the difference in phase of an infeed conveyor and an outfeed conveyor. The mechanical construction of the cam drive can introduce a limit to the range of phase errors between the infeed apparatus and the outfeed apparatus which can be compensated for by the transfer mechanism. In addition, the cam mechanism cannot readly be conditioned for changes in the infeed apparatus and outfeed apparatus.

U.S. Patent No. 3,075,630, issued Jan. 29, 1963 in the name of R. W. Fisk, discloses the use of a transfer conveyor between an infeed and an outfeed conveyor. In the patent the transfer conveyor is capable of accelerating an article to the speed of the outfeed conveyor at the moment the article is transferred from the transfer conveyor to the outfeed conveyor; however, the transfer conveyor of the patent necessarily requires that the incoming article from the infeed conveyor be first decelerated to a stationary condition on the transfer conveyor before the article is subsequently accelerated to the speed of the outfeed conveyor. The need to decelerate the article obviously is a limitation in the efficient operation of the transfer conveyor.

Summary of the invention

The machine of the invention includes means adapted to be disposed between an infeed apparatus and an outfeed apparatus for conveying an article therebetween. Means are provided for driving the conveying means at a plurality of frequencies of events therein which are at least equal to the frequency of events of the outfeed apparatus. There is included a means for producing a plurality of control signals, each of which are in response to a different one of a plurality of phase conditions of the outfeed apparatus. The phase conditions include a condition in which the article cannot be conveyed by the conveying means to the outfeed apparatus, a condition in which the article can be conveyed to the outfeed apparatus, and a condition in which the article can be conveyed only at an accelerated speed to the outfeed apparatus. The machine of the invention includes means for detecting the arrival of an article from the infeed apparatus to the conveying means. In addition, there is included means for controlling the driving means of the conveying means into a selected one of a plurality of states of operation. The states of operation include a state corresponding to terminated operation of the conveying means, a state corresponding to the operation of the conveying means at a normal frequency, and a state corresponding to the operation of the conveying means at an accelerated frequency. The controlling means for the driving means selects one of the plurality of states of operation in response to the control signal from the control signal producing means and the detection of the arrival of an article by the detecting means. In this way the conveying means can be operated by the driving means to insure delivery of the article to the outfeed apparatus in a predetermined phase relationship therewith which results in the article being delivered to a predetermined location on the outfeed apparatus.

The machine of the invention eliminates the functional and constructional problems of the prior art devices. In the machine of the invention it is merely necessary to produce a control signal in response to the phase condition of the outfeed apparatus and to detect the arrival of an article from the infeed apparatus to the conveying means. In response to the control signal and the detection of the arrival of the article, the conveying means is either stopped, advanced at a speed corresponding to that of the outfeed apparatus, or accelerated to a speed greater than that of the outfeed apparatus. In any event, the article is subsequently delivered in a predetermined phase relationship to the outfeed apparatus and thereby to a predetermined location upon the outfeed apparatus.

Since control signals are derived from the outfeed apparatus and since the arrival of the article is nearly detected, the machine of the invention can be readily adjusted to accommodate changes in the outfeed apparatus as well as the infeed apparatus.

The machine of the invention eliminates the complex operation of prior art devices in which the article must be decelerated to a point of termination of movement while on the transfer conveyor. Thus the machine of the invention either stops operation upon the arrival of the article, moves the article at a speed corresponding to that of the outfeed conveyor, or accelerates the article with respect to the outfeed conveyor.

Brief description of the drawings

FIG. 6 is a fragmentary plan view of the exit end portion of the discharge conveyor of the machine;

FIG. 7 is a fragmentary side elevational view adjacent to the exit portion of the machine showing an electrical pickoff for sensing the phase relationship of the discharge conveyor;

FIG. 8 is a side elevational view of a disk of predetermined arcuate extent for use in conjunction with the electrical pick-off;

FIG. 9 is a side elevational view of the entrance drive to the discharge conveyor including a schematic representation of the predetermined phase relationship of the discharge conveyor; and FIGS. 10 and 11 are schematic representations of the electrical apparatus including the electrical switching arrangement of the invention.

Description of the preferred embodiments

Transfer machine 20 of the invention (FIG. 1) is designed to move a book or a group of signatures standing on edge on the backbone thereof from a conveyor chain such as gatherer chain 21 of a gatherer (not shown) to another machine conveyor chain such as the conveyor chain of a binder (not shown). In addition, the transfer machine of the invention is capable of transferring an article or such a book from one machine having a conveyor chain with a predetermined pin division or interval into another machine having a conveyor chain with a different operating speed and/or a different predetermined pin division or spacing from the infeed chain.

The transfer machine receives an article, such as a book or a group of signatures from an infeed apparatus, such as gatherer chain 21, and delivers the article or book to outfeed apparatus such as transfer chain 22. From the transfer chain, the books are delivered to another machine conveyor chain, such as the binder infeed chain of a binder (not shown).

Figure 2:
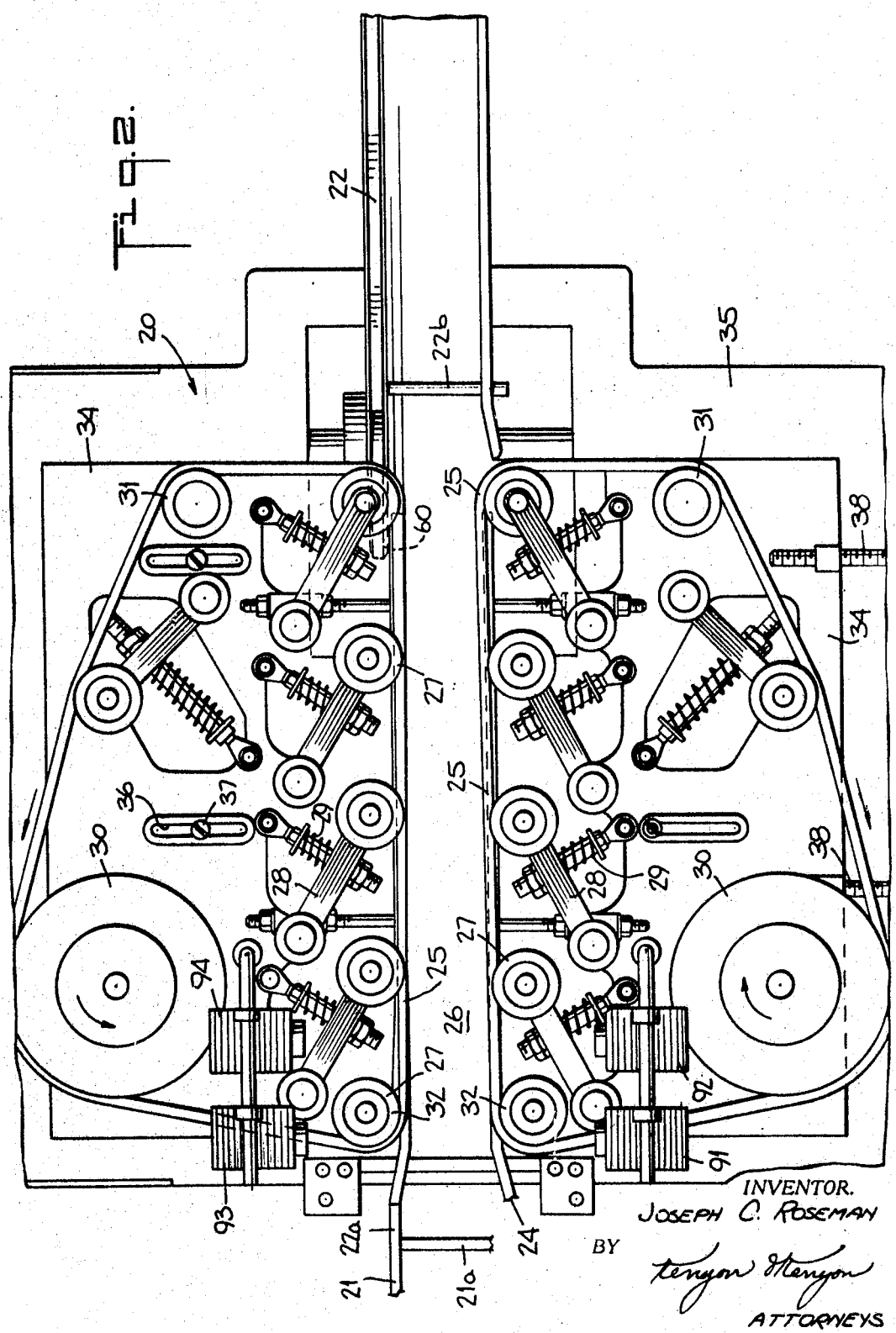
FIG. 2 is a fragmentary plan view of the transfer machine showing the transfer conveyor.

As shown in FIG. 2 gatherer chain 21 having pins 21a passes about sprocket 22a. The pin urge the trailing edges of the books or groups of signatures to advance them between guides 24 and to the position where the books are engaged by belts 25 which comprise the means for conveying the article or book from the infeed apparatus to the outfeed apparatus.

Belts 25 which extend longitudinally through the machine adjacent to support plate 26 are urged toward the longitudinal center line of the support plate and then toward the sides of the books by pulleys 27. Each of the rollers is pivotally mounted by arm 28 which is biased toward the belt adjacent thereto by spring units 29. Belts 25 are driven in the direction of the arrows as shown in FIG. 2 by drive pulleys 30. The belts extend about idler pulleys 31 and 32. Pulleys 33, which are spring biased similarly as pulleys 27 assist in maintaining belts 25 in a taut condition.

The drive pulleys, the pulleys for urging the belts against the books, and the idler pulleys are all mounted upon support plates 34 which, in turn, are supported by bed plate 35 of the machine. Support plates 34 are guided for lateral motion with respect to plate 26 by means of slots 36 through which extend screws 37. The lateral movement of the support plate can be imparted thereto by screw jacks 38.

Figure 1:
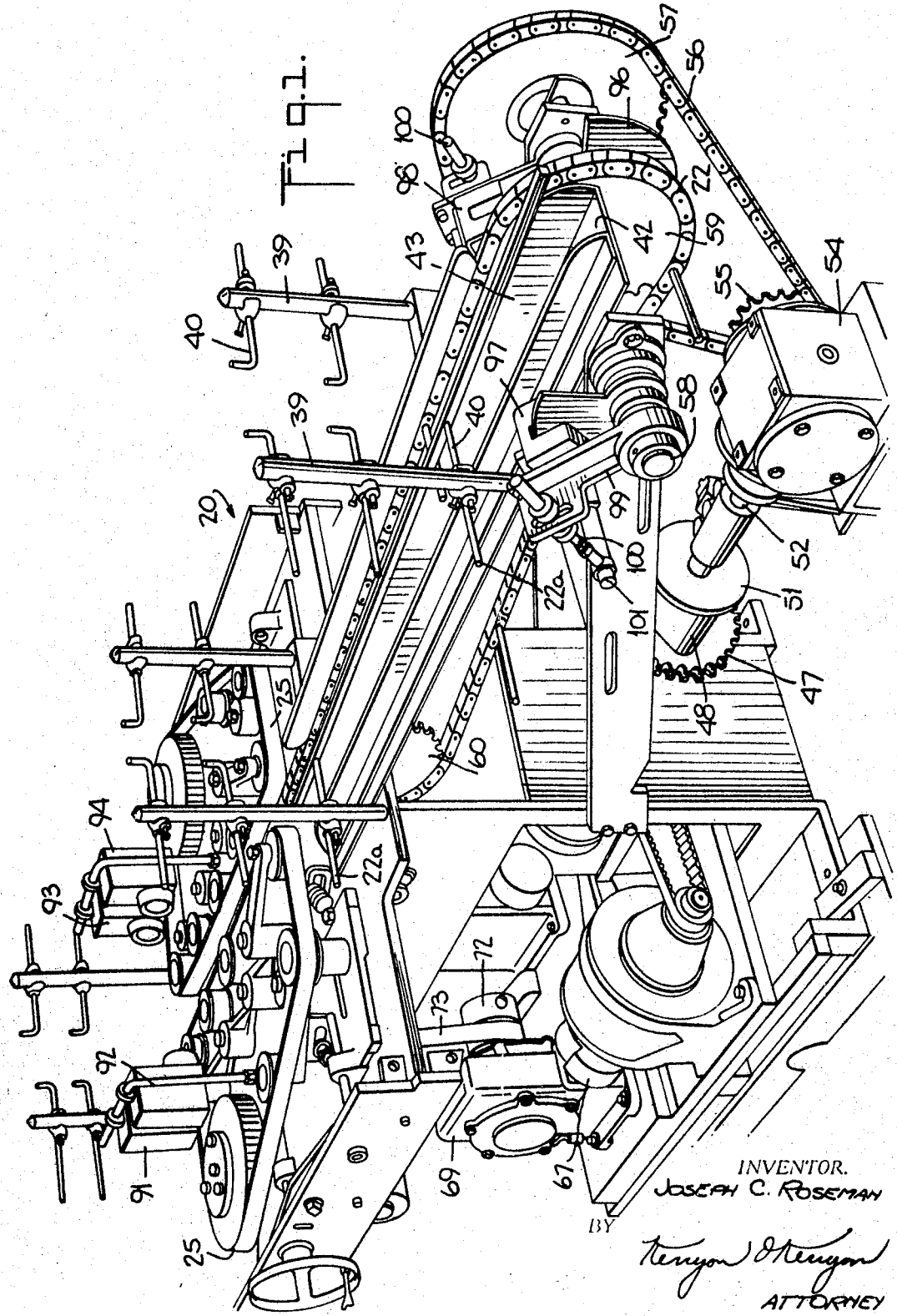
FIG. 1 is a perspective view of the transfer machine of the invention looking toward the exit side of the machine.

As shown in FIG. 1 the machine is provided with uprights 39 which support arms 40 which can be positioned vertically and horizontaly with respect to the uprights. Arms 40 are adapted to support guide rails such as guide rail 41. Thus, beyond belts 25, each book is guided and supported by side guides 42 and 43 as well as by guide rail 41.

The drive to the transfer machine can originate from a separate prime mover or the drive can be taken from a machine to which the transfer machine is to deliver articles. In the case where the transfer machine is delivering books or groups of signatures to a binder, the drive for the transfer machine can be taken from a drive of the binder such as drive 44 (FIG. 3).

Chain 45 connects drive sprocket 46 to driven sprocket 47 which is coupled to clutch body 48 containing pins 49. Sprocket 47 and clutch body 48 are together attached to shaft 50. Clutch plate 51 containing openings adapted to engage pins 49 is attached to shaft 52. When the pins are engaged with the openings in the clutch plate, the drive of sprocket 47 is transmitted to shaft 52. Switch 53 senses the engaged and disengaged positions of plate 51 with respect to pins 49.

Shaft 52 by means of angle drive 54 drives sprocket 55 which is coupled to chain 56 (FIG. 1). Chain 56 drives sprocket 57 and thereby shaft 58 connected thereto. Sprocket 59 connected to shaft 58 is thereby driven and in turn advances transfer chain 22 about idler sprocket 60.

Figure 3:
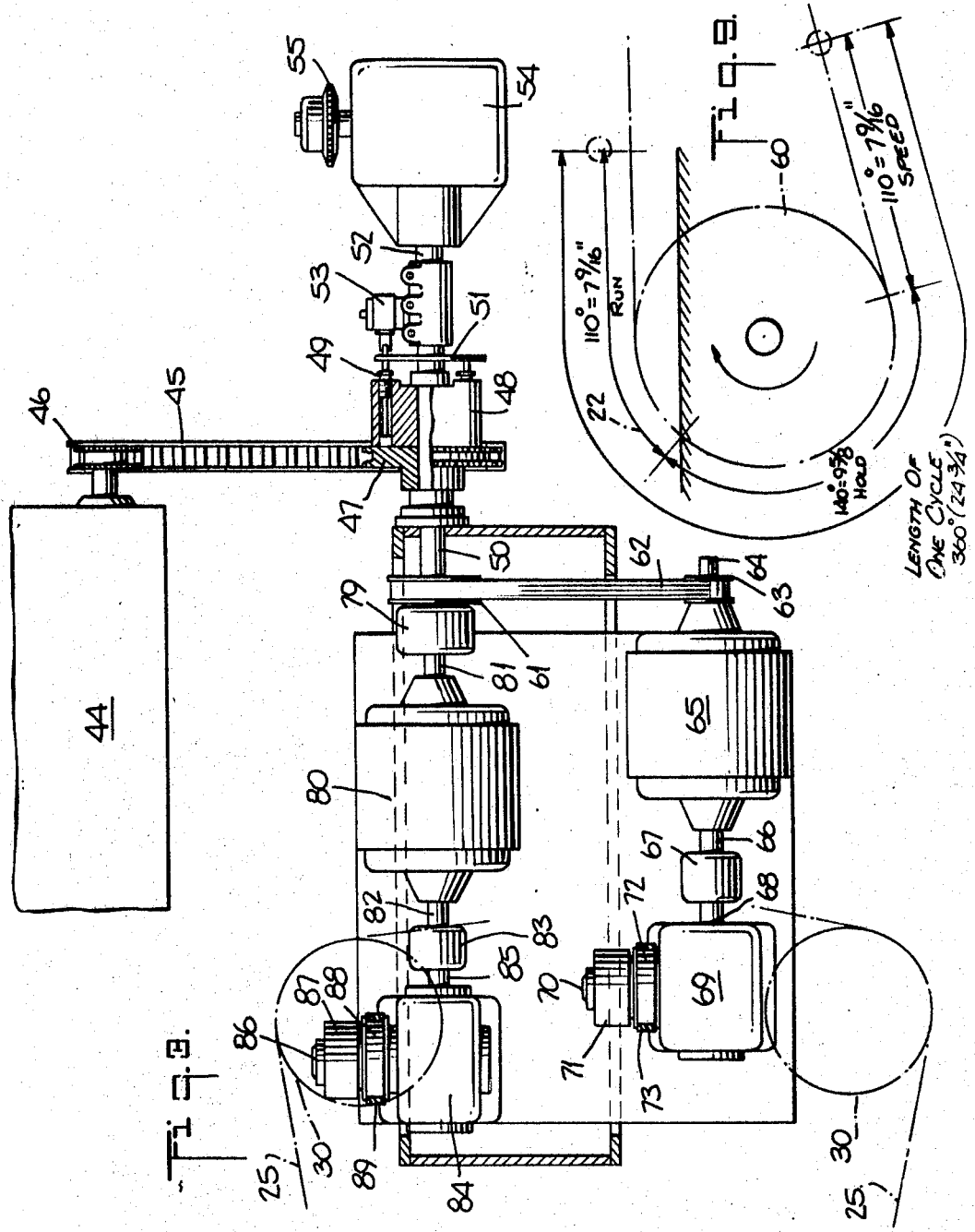
FIG. 3 is a plan view of the plurality of drives of different speed ratios for the transfer conveyor of the invention.

The drive from chain 45 and sprocket 47 to shaft 50 is transmitted to pulled 61 which is engaged with belt 62 (FIG. 3). Belt 62 is engaged with sprocket 63 which is attached to input shaft 64 of electric clutch 65. The electric clutch can be of a type manufactured by the Warner Electric Brake and Clutch Company, Beloit, Wis., and designated model No. EP500.

The output shaft 66 is connected by flexible coupling 67 to input shaft 68 of speed changer 69. Speed changer 69 is selected to have a speed ratio greater than unity so that output shaft 70 operates at an increased speed with respect to input shaft 68. By way of example, the speed ratio can be selected to be the value of two.

Output shaft 70 of speed changer 69 is connected by overrunning clutch 71, which, in turn, is coupled to pulley 72 about which belt 73 passes.

Figure 5:
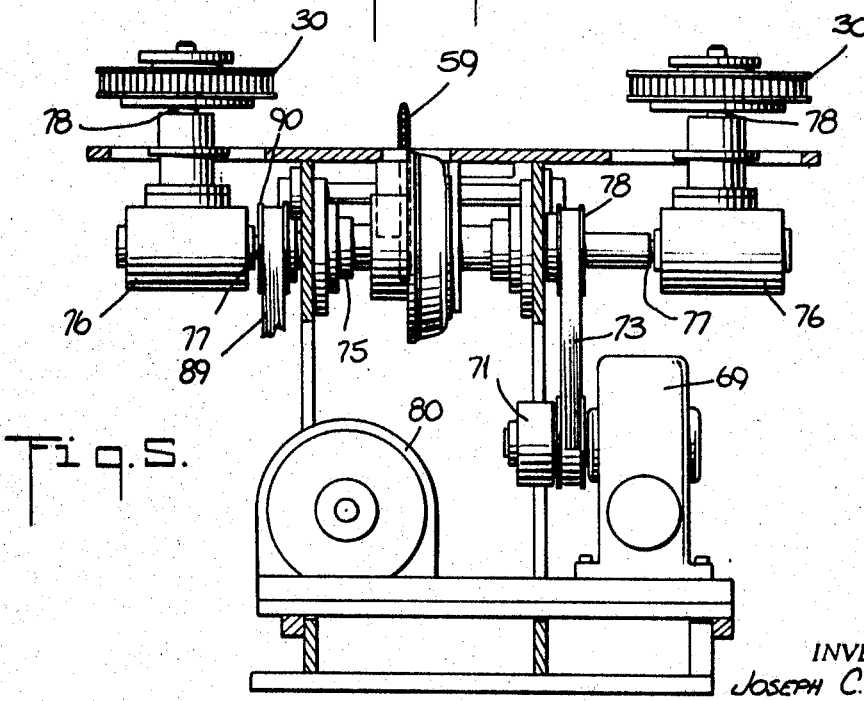
FIG. 5 is an end elevational view showing the drives connected to the transfer conveyor.

As shown in FIG. 5, belt 73 engages pulley 74 which is mounted upon shaft 75. Shaft 75 is connected to each of angle drives 76 by means of slip joints such as splined shafts 77. By virtue of the slip joints, the angle drives can be adjusted outwardly away from one another when it is desired to change the intervals between the belts 25. Output shafts 78 of each of the angle drives are connected to drive pulleys 30 about which belts 25 are driven.

As shown in FIG. 3, shaft 50 is connected by flexible coupling 79 to electric clutch 80, having input shaft 81 and output shaft 82. Clutch 80 can be similar in design to clutch 65. Output shaft 82 is connected through flexible coupling 83 to angle drive 84 which can be selected to have a ratio of substantially unity so that input shaft 85 of the angle drive rotates at substantially the same velocity as output shaft 86. Overrunning clutch 87 connected to shaft 86 is coupled to pulley 88 which drives belt 89.

Figure 4:
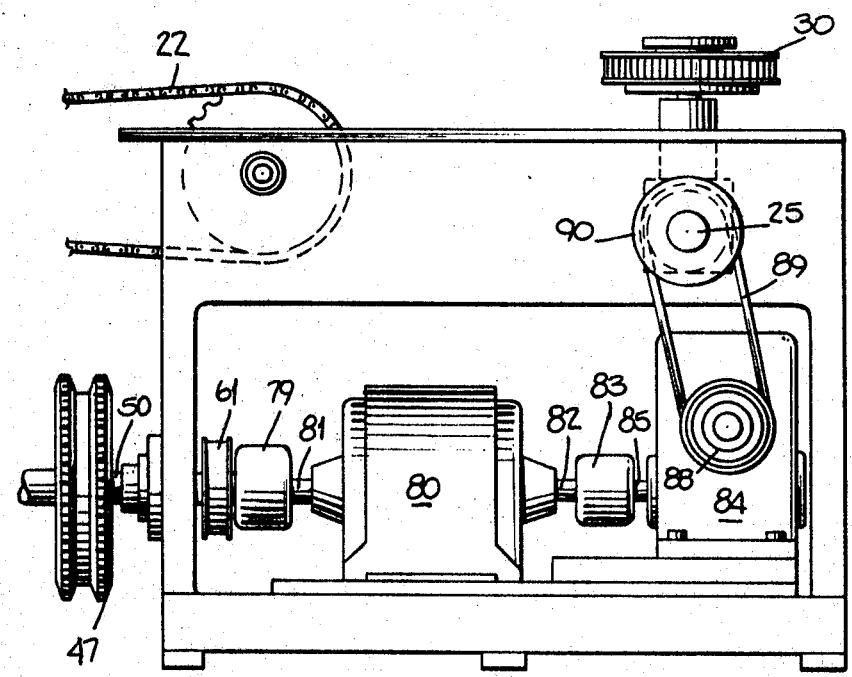
FIG. 4 is a side elevational view of a drive to the transfer conveyor.

As shown in FIGS. 4 and 5 belt 89 is engaged with pulley 90 which is mounted upon shaft 75. With this arrangement it can be understood that the engagement of either electric clutch 65 or 80 enables one of a pair of different speed ratios to be transmitted to shaft 75 and thereby through angle drive 76 to pulleys 30. The provision of overrunning clutches 71 and 87 prevents the angle drives from interfering with one another when either one of the two electric clutches are engaged. Similarly, clutch 71 enables angle drive 69 and clutch 65 to decelerate whenever clutch 65 is disengaged and clutch 80 is engaged.

As discussed above, belts 25 are driven from the binder at a speed equal to, or greater than, the frequency of events or speed of gatherer chain 21. Once a book is advanced between the belts 25, it is gripped therebetween and is advanced toward photoelectric cells 91 and 92 which are positioned in a facing relationship with light sources 93 and 94, respectively (FIGS. 1 and 2). Until the book or groups of signatures passes photocell 91, no circuit is energized; however, as soon as the book or group of signatures pass photocell 91, a signal is delivered to the electrical circuitry of the transfer machine. At this point the book is considered to be in the "critical position."

As shown in FIGS. 1 and 3 transfer chain 22 is also driven, by way of example, from the binder in direct time with the binder infeed chain. For example, transfer chain 22 can consist of a series of four chain sections between adjacent pairs of pins 22b. Further, by way of example, each chain section can have a length of approximately 24¾ inches. Since chain 22 is timed to the binder infeed chain (not shown), chain 22 will deposit one book into a binder chain section after receiving that book from between belts 25.

The timing for action for the means for controlling the operation or driving of belts 25 is determined by the instantaneous position of the transfer chain pin 22b when a book or group of signatures enters the "critical position." At this point, a plurality of various conditions of the outfeed apparatus, that is, transfer chain 22, can exist.

If, when the book enters into the critical position, belts 25, moving at their normal speed, can deposit the book conveniently between adjacent carrier pins 22b of transfer chain 22, the book will be so advanced and delivered no other action will occur.

If the condition is such that a book could abut a preceding carrier pin 22b when traveling at the normal speed of belts 25, a signal is delivered to terminate the operation of the belts for a time period of sufficient length to allow pin 22b to move ahead. Subsequently the stopped book can be moved into between pins 22b.

Another condition can result in which a book traveling at the normal speed of belts 25 is late upon arriving at transfer chain 22 and thus can not be properly engaged by pins 22b. In this condition a signal is produced when the book is in the "critical position" to accelerate belts 25 and thereby deliver a book between pins 22b of transfer chain 22.

The transfer machine of the invention can readily be employed between a high-speed gatherer and a binder. By way of example, the top speed of a gatherer-binder combination can be in the range of about 200 books per minute. At this speed, the gatherer and binder combination can be mechanically locked together and subsequently the transfer of a book or a group of signatures from the gatherer to the binder is a direct operation since both conveyor chains operate at the same speed.

When there is a stop in the operation of the binder, both the binder and the gatherer will coast to a stop in an even manner. Further, by way of example, in the case of a gatherer-stop, the units will coast to a speed of about 40 books per minute; subsequently, the binder will continue to run at this reduced constant speed while the gatherer will continue to decelerate to an ultimate stop.

Since the above action is not instantaneous, a certain period of time is involved during which books continue to be moved from the gatherer chain to the binder infeed chain. With the binder continuing to run at the rate of about 40 books per minute, by way of example, and with the gatherer stopped, there is a period of time during the operation when there is a differential speed condition. The transfer machine of the invention comes into play during the condition previously discussed. In addition, when a gatherer is started or is being jogged, a speed differential condition with respect to the binder occurs and, again, the transfer machine becomes necessary.

The means for producing a plurality of control signals each in response to a different one of a plurality of phase conditions of the outfeed apparatus, such as transfer chain 22, comprises vanes or discs 95 and 96 mounted upon shaft 58 which is driven by chain 56 and sprocket 57. By way of example, discs 95 and 96 (FIG. 6) rotate adjacent to transducers 97 and 98, respectively. By way of example, transducers 97 and 98 can be sensors which are responsive to the presence or absence of discs 95 and 96 of permeable material disposed between pole pieces 97a and 98a, respectively.

In order to actuate transducers 97 and 98, during a predetermined portion of the rotation of shaft 58, which corresponds to the passage of one chain section 22a with respect to sprocket 59, discs 95 and 96 can be formed to have the pattern of arcuate extent shown in FIG. 8.

As shown in FIGS. 1, 6 and 7 transducers 97 and 98 are mounted with respect to arms 99 which, in turn, are pivotally supported with respect to shaft 58. The position of transducers 97 and 98, with respect to their respective discs is adjustably positioned by the proper adjustment of threaded links 100 which are connected to the free ends of arms 99 and pivotally mounted with respect to shaft 101 attached to the frame of the machine.

FIG. 9 graphically portrays the possible conditions in which pin 22b of transfer chain 22 can be when a book reaches the "critical position" with respect to the photocells. In FIG. 9 chain 22 is shown disposed about sprocket 60 at the entrance to the transfer chain. Between pins 22b in FIG. 9 there is shown a total distance for a section of chain 22 equal to 24¾ inches by way of example. This corresponds to a single chain section of the transfer chain and the length of one cycle of events of the transfer chain or outfeed conveyor. Chain 22 moves in the direction of the arrow shown in FIG. 9. With pin 22b in the region marked "speed" and corresponding to 110° or 7%6 inches by way of example, it is possible to engage clutch 65 and accelerate belts 25 by angle drive 69 and thereby deliver a book from the "critical position" into between adjacent pins 22b. When pin 22b is in the region marked "hold" and indicated as being 140° or 9⅝ inches, by way of example, it is not possible to move a book from the "critical position" to between adjacent pin 22b and therefore the drive to belts 25 must be terminated.

When the pin 22b is in the region marked "run" and indicated as being of approximately 110° or 7%6 inches, as shown in FIG. 9, a book can be permitted to advance at the normal speed of belts 25 and still arrive in the proper position between the pins 22b. Thus, in this case, clutch 80 would be energized to drive belts 25 through angle drive 84.

Figure 10:
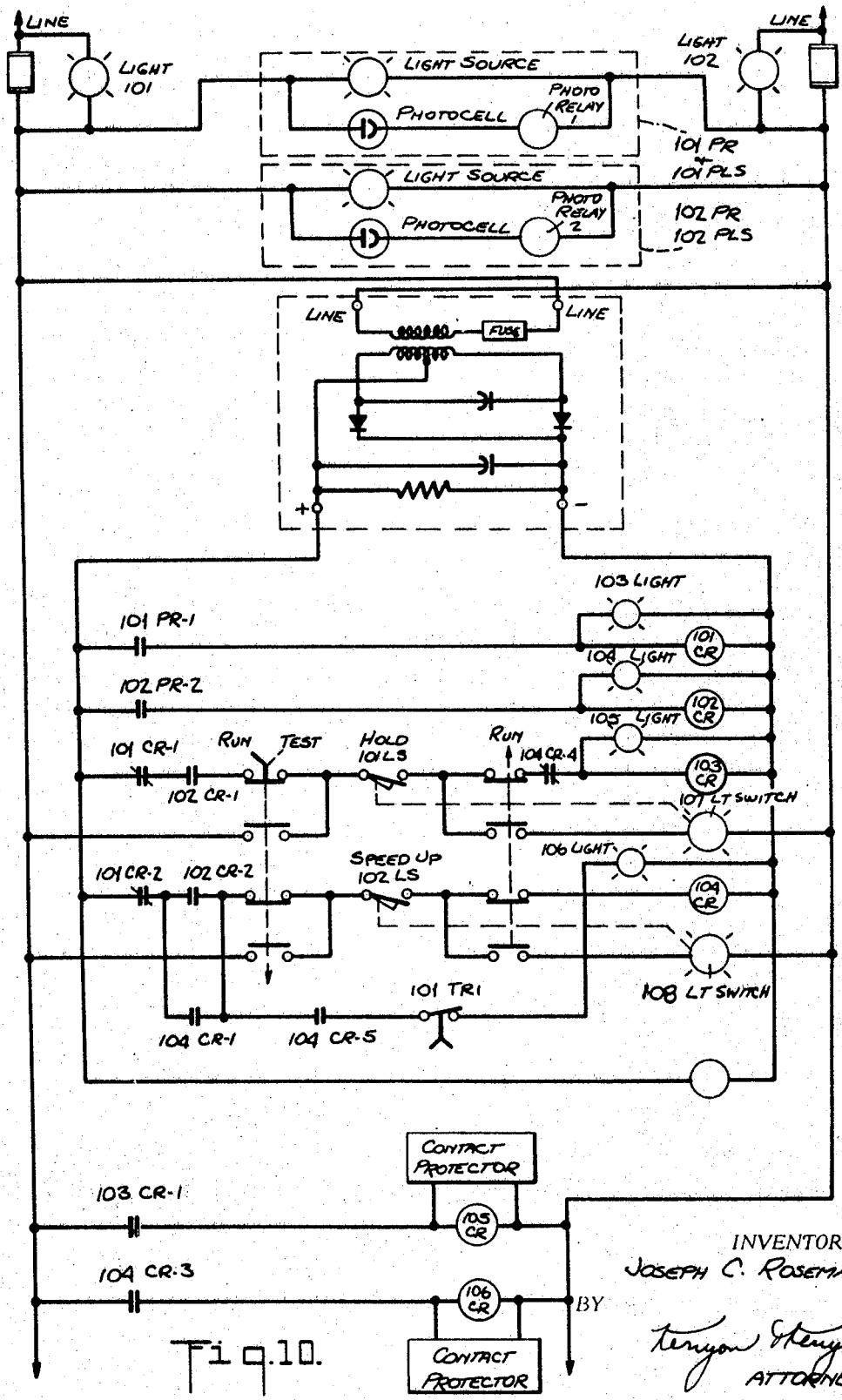

A schematic drawing of the electrical system of the transfer machine is shown in FIGS. 10 and 11. Selector switch 101 SS is shown in the running position. The advancing book blocks the light applied to the photocell 91 connected to photorelay 101 PR. The advance of the book to photocell 91 and the deenergizing of photorelay 101 PR result in the opening of contacts 101 PR–1 which in turn deenergize relay 101 CR. The deenergizing of relay 101 CR causes the closure of contacts 101 CR–1. The actuation of the vane sensor 107 LT causes the closing of "hold switch" 101 LS. Since contacts 102 CR–1 remain open, relay 103 CR remains deenergized. As a result contacts 103 CR–1 remain open and relay 105 CR remains deenergized. With relay 105 CR deenergized, contacts 105 CR–1 remain closed and energize clutch 80. At the same time, contact 105 CR–2 remain open so that brake 80a remains deenergized.

Upon the advancement of the book to photocell 92, light is blocked from photocell 102 PR and contacts 102 PR–1 remain open and thereby deenergize relay 102 CR. With relay 102 CR deenergized, contacts 102 CR–1 remain open and thus relay 103 CR remain deenergized. Since relay 103 CR remains deenergized, contacts 103 CR–1 remain open and relay 105 CR remains deenergized. Consequently, as the book passes photocell 92 (102 PR) the clutch 80 remains engaged and brake 80a remains deenergized.

During the running cycle described above, which is shown in FIG. 9, relay 106 CR remains deenergized and therefore clutch 65 remains disengaged due to the open condition of contacts 106 CR–1.

When an incoming book is in the "critical position" and pin 22b is entering the "hold" portion of the cycle shown in FIG. 9, disc or vane sensor 107 LT is energized thereby closing "hold switch" 101 LS. At this point, the book has not advanced adjacent to photocell 92, and, therefore, contacts 102 PR–1 are closed. As a result, contacts 102 CR–1 are also closed. At this point the book arrives adjacent to photocell 91 and as a result contacts 101 PR–1 are opened. In return, contacts 101 CR–1 are closed. As a result relay 103 CR is actuated. In return, the closing of contacts 103 CR–1 energizes relay 105 CR. With this condition clutch 80 is deenergized by the opening of contacts 105 CR–1 and brake 80a is applied by the closing of contacts 105 CR–2. At the same time the closing of contacts 105 CR–3 energizes brake 65b.

At this point it should be noted that with vane or sensor 108 LT deenergized, speedup switch 102 LS remains open and consequently relay 104 CR remains deenergized. As a result, contacts 104 CR–3 remain open and relay 106 CR remains deenergized. Thus clutch 65 remains deenergized by open contacts 106 CR–1.

With the book at the "critical position" and pin 22b entering into the region identified as "speed" in FIG. 9, disc or vane sensor 108 LT becomes energized and closes switch 102 LS. When the book arrives adjacent to photocell 91, relay 101 PR is deenergized and therefore contacts 101 CR–1 of relay 101 CR remain closed. Since the book has not arrived at photocell 92, contacts 102 PR–1 remain closed. As a result, relay 102 CR is energized and contacts 102 CR–2 are closed. This energizes relay 104 CR through speedup switch 102 LS. Consequently, contacts 104 CR–3 are closed, thereby energizing relay 106 CR. In turn, relay 106 closes contacts 106 CR–1 which energize clutch 65 and thereby effect the speedup of the belts 25. At this point clutch 80 remains energized but the overrunning clutch 87 prevents any interference in the drive to shaft 75.

What is claimed is:

1. A machine for receiving an article from an infeed apparatus and for delivering the article to an outfeed apparatus, the infeed apparatus and the outfeed apparatus operating substantially independent of one another and during the normal operation thereof having a first predetermined substantially constant phase relationship between the frequency of events of the infeed apparatus and the frequency of events of the outfeed apparatus, said machine enabling the article to be delivered to the outfeed apparatus in a second predetermined phase relationship with respect to the frequency of events of the outfeed apparatus, the second predetermined phase relationship enabling the article to be delivered to a predetermined location on the outfeed apparatus, said machine comprising:

(a) means adapted to be disposed between the infeed apparatus and the outfeed apparatus for conveying the article from the infeed apparatus to the outfeed apparatus;

(b) means for driving said conveying means at a plurality of frequencies of events therein which are at least equal to the frequency of events of the outfeed apparatus;

(c) means for producing a plurality of control signals each in response to a different one of a plurality of phase conditions of the outfeed apparatus, the plurality of phase conditions of the outfeed apparatus corresponding at least to (i) a first condition in which the article cannot be conveyed by said conveying means to be delivered to the outfeed apparatus in the second predetermined phase relationship, (ii) a second condition in which the article can be conveyed by said conveying means at a frequency of events at least equal to that of the outfeed apparatus to be delivered thereto in the second predetermined phase relationship, (iii) a third condition in which the article can be conveyed by said conveying means at a frequency of events substantially greater than that of the outfeed apparatus to be delivered thereto in the second predetermined phase relationship, (d) means for detecting the arrival of an article from the infeed apparatus to said conveying means; and (e) means for controlling said driving means into a selected one of a plurality of states of operation including (i) a first state corresponding to terminated operation of said conveying means, (ii) a second state corresponding to said conveying means operating at a frequency of events at least equal to frequency of events of the outfeed apparatus, (iii) a third state corresponding to said conveying means operating at a frequency of events substantially greater than the frequency of events of the outfeed apparatus, said controlling means controlling said driving means into a selected one of a plurality of states of operation in response to the control signal from said control signal producing means and the detection by said detecting means, whereby said conveying means can be operated by said driving means to insure delivery of the article to the outfeed apparatus in the second predetermined phase relationship therewith.

2. A machine in accordance with claim 1 in which said means for driving said conveying means at a plurality of frequencies of events therein at least equal to the frequency of events of the outfeed apparatus comprises means for driving said conveying means at frequencies of events therein corresponding substantially to and substantially twice to the frequency of events of the outfeed apparatus.

3. A machine in accordance with claim 1 in which said means for driving said conveying means at a plurality of frequencies of events therein at least equal to the frequency of events of the outfeed apparatus is adapted to be actuated in accordance with the operation of the outfeed apparatus.

4. A machine in accordance with claim 3 in which said means for driving said conveying means is adapted to be connected to the outfeed apparatus for actuation in response to the operation of the outfeed apparatus.

5. A machine in accordance with claim 1 in which said means for producing a plurality of control signals each in response to a different one of a plurality of phase conditions of the outfeed apparatus comprises a transducer adapted to be actuated in accordance with the operation of the outfeed apparatus.

6. A machine in accordance with claim 5 in which said transducer comprises:

(a) at least one disc driven in rotation at a frequency which is a function of the frequency of the events of operation of the outfeed apparatus, said disc containing a pattern therein corresponding to the plurality of phase conditions of the outfeed apparatus; and (b) a sensor disposed adjacent to said disc for producing a plurality of control signals in response to the passage of the pattern of said disc adjacent thereto.

7. A machine in accordance with claim 1 in which said means for detecting the arrival of an article from the infeed apparatus to the conveying means comprises an additional transducer disposed adjacent to the entrance portion of the conveying means, said transducer being actuated in response to the arrival of an article adjacent thereto.

8. A transducer in accordance with claim 7 in which said additional transducer comprises at least one photoelectric device.

9. A machine in accordance with claim 1 in which said detecting means comprises a pair of additional transducers disposed adjacent to the entrance portion of the conveying means, said transducers being successively actuated in response to the arrival of an article adjacent thereto.

10. A machine in accordance with claim 9 in which said pair of additional transducers are adapted to be serially connected to said means for producing a plurality of control signals.

11. A machine in accordance with claim 10 in which said pair of transducers comprises a pair of photoelectric relays, each of said photoelectric relays having an output circuit serially connected with the other.

12. A machine in accordance with claim 1 in which said means for driving said conveying means at a plurality of frequencies of events therein which are at least equal to the frequency of events of the outfeed apparatus comprises:
(a) a plurality of drives of different speed ratios,
(b) a plurality of means for coupling said plurality of drives to said conveying means independent of the operation of one another,
(c) and means responsive to said control signals producing means for selectively clutching any different one of said plurality of drives to said conveying means.

13. A machine in accordance with claim 1 in which each of said plurality of drives of different speed ratios comprises a gear drive.

14. A machine in accordance with claim 12 in which each of said plurality of means for coupling said plurality of drives to said conveying means independent of the operation of one another comprises a clutch device.

15. A machine in accordance with claim 1 in which said means for controlling said driving means into a selected one of a plurality of states of operation comprises:
(a) means for comparing any one of the plurality of control signals from said control signals producing means with the detection of said detecting means, and
(b) means responsive to the comparison by said comparing means for delivering a plurality of different output control signals to said driving means, each of said different output control signals corresponding to a different one of the states of operation of said driving means.

16. A method of receiving an article from an infeed apparatus and of delivering the article to an outfeed apparatus, the infeed apparatus and the outfeed apparatus operating substantially independent of one another and during the normal operation thereof having a first predetermined substantially constant phase relationship between the frequency of events of the infeed apparatus and the frequency of events of the outfeed apparatus, said method enabling the article to be delivered to the outfeed apparatus in a second predetermined phase relationship with respect to the frequency of events of the outfeed apparatus, the second predetermined phase relationship enabling the article to be delivered to a predetermined location on the outfeed apparatus, said method comprising the steps of:

(a) conveying the article from the infeed apparatus to the outfeed apparatus at one of a plurality of frequencies of events therein which are at least equal to the frequency of events of the outfeed apparatus;
(b) producing a plurality of control signals each in response to a different one of a plurality of phase conditions of the outfeed apparatus, the plurality of phase conditions of the outfeed apparatus corresponding at least to
(i) a first condition in which the article cannot be conveyed by said conveying means to be delivered to the outfeed apparatus in the second predetermined phase relationship,
(ii) a second condition in which the article can be conveyed by said conveying means at a frequency of events at least equal to that of the outfeed apparatus to be delivered thereto in the second predetermined phase relationhsip,
(iii) a third condition in which the article can be conveyed by said conveying means at a frequency of events substantially greater than that of the outfeed apparatus to be delivered thereto in the second predetermined phase relationship,
(c) detecting the arrival of an article to be conveyed from the infeed apparatus; and
(d) controlling the step of conveying into a selected one of a plurality of states of operation including:
(i) a first state corresponding to terminated operation of the step of conveying,
(ii) a second state corresponding to the step of conveying operating at a frequency of events at least equal to frequency of events of the outfeed apparatus,
(iii) a third state corresponding to the step of conveying operating at a frequency of events substantially greater than the frequency of events of the outfeed apparatus, the controlling step controlling the step of conveying into a selected one of a plurality of states of operation in response to the step of controlling and the steps of detecting whereby said step of conveying can be controlled to insure delivery of the article to the outfeed apparatus in the second predetermined phase relationship therewith.

References Cited

UNITED STATES PATENTS 3,075,630 1/1963 Fisk _____ 198—76
3,399,755 9/1968 Bryson _____ 198—34

RICHARD E. AEGERTER, Primary Examiner

U.S. Cl. X.R.

198—34, 37, 76